Feb. 8, 1927. 1,616,841

F. H. BEEBE

MOTOR OPERATED GATE VALVE

Filed Nov. 18, 1925  3 Sheets-Sheet 1

Feb. 8, 1927.
F. H. BEEBE
1,616,841
MOTOR OPERATED GATE VALVE
Filed Nov. 18, 1925   3 Sheets-Sheet 2
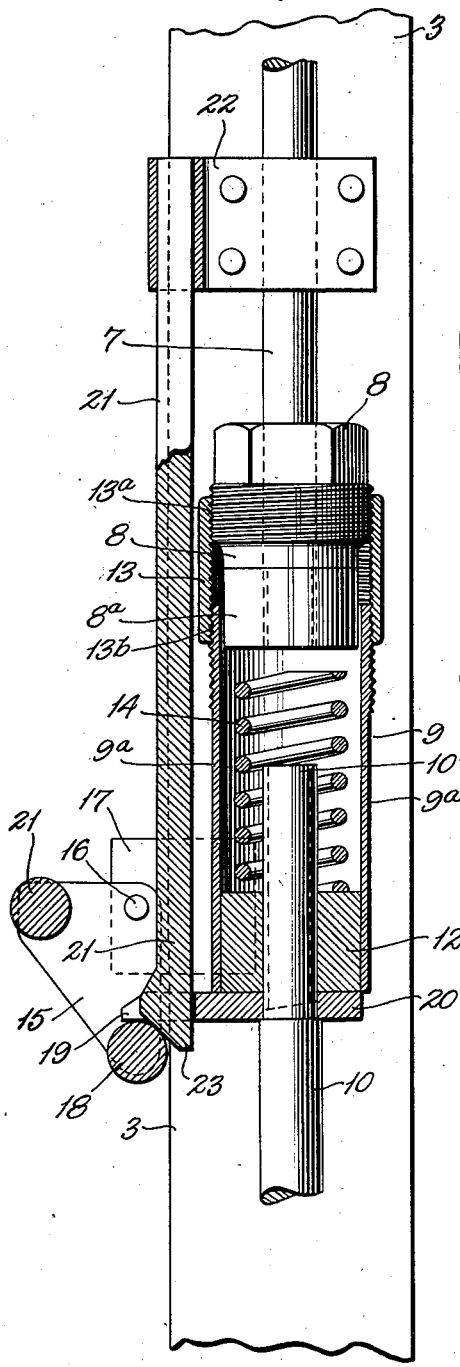
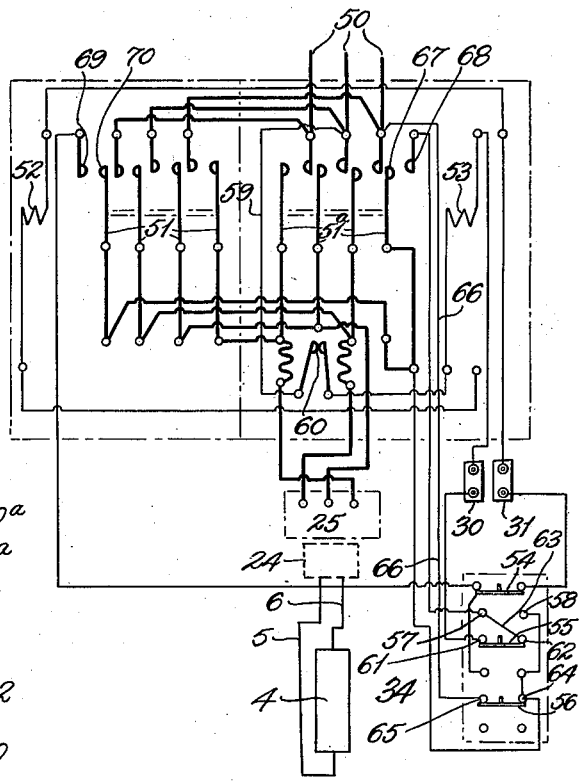
Inventor
Frederick H. Beebe
By Munday Clarke & Carpenter
his Attorneys Feb. 8, 1927.  1,616,841
F. H. BEEBE
MOTOR OPERATED GATE VALVE
Filed Nov. 18, 1925  3 Sheets-Sheet 3

Inventor
Frederick H. Beebe
By Munday Clarke & Carpenter
His Attorneys

Patented Feb. 8, 1927.

1,616,841

UNITED STATES PATENT OFFICE.

FREDERICK H. BEEBE, OF FORT WAYNE, INDIANA, ASSIGNOR TO THE WESTERN GAS CONSTRUCTION COMPANY, OF FORT WAYNE, INDIANA, A CORPORATION OF INDIANA.

MOTOR-OPERATED GATE VALVE.

Application filed November 18, 1925. Serial No. 69,915.

The invention relates to motor-power operated valves and relates more particularly to valves of the gate type, and has for its objects to provide a new and improved apparatus for opening and closing such valves at desired intervals from a remote control station by cooperating electrical and mechanical means.

In the operation of gate valves it has heretofore been general practice to manually operate the same when desired by mechanical instrumentalities, or the valves have been reciprocated to open and closed position by means of hydraulic pressure communicating with a pressure cylinder operatively connected with the gate valve stem, said hydraulic pressure being released at the desired time by manual or automatic control of suitably disposed cut-off valves. It has furthermore been the practice to operate such valves by means of a hand wheel suitably geared to the valve stem which hand wheel in certain installations may be additionally revolved by means of a motor drive. When employing a motor it has been common practice to employ an intermediate gear having an internal screw threaded hub corresponding to the screw thread in the hand wheel, the rotation of said gear by means of the motor resulting in the opening and closing of the valve.

The use of the motor drive for automatically reciprocating the gate valve stem in the manner described necessitates the installation of considerable intermediate reduction gearing, automatic stops, switches and starting devices, all of which are necessary and which render the installation a complicated and difficult matter as well as usually attended by prohibitive expense. A further serious objection to all of the known types of motor operated gate valves, is the necessity for very accurate adjustment of the stops controlling and actuating the limit switches, in order that the power shall be automatically thrown off before the valve reaches its limit of movement in either direction to prevent the possibility of strains or breakage in the valve parts. A further objection and disadvantage encountered in the installation of known types of motor operated valves results from the fact that the motors must be located directly on the frame of the valve; the motors are therefore out of doors, and are often under water, with the result that serious difficulties attended upon maintenance and operation must be overcome.

A principal object of the present invention consists in the provision of a gate valve or valves designed to be operated by hydraulic pressure maintained by suitable pumps, the actuation of which pump mechanism to move the valve in either direction is controlled by a motor suitably geared thereto, and which motor may be automatically and electrically energized and reversed by push buttons or switches from a remote control station.

A further object of the invention is to provide an electrically and mechanically operated gate valve actuating mechanism which is combined with a duplicate manually operating mechanism installed in parallel on the pressure lines, so that the valve may be manually actuated when desired in the event of the unforeseen failure of the current supply or mechanism in the electrically actuated motor system.

A further object of the invention is to provide a motor operated hydraulic gate valve controlling mechanism in which the hydraulic pressure is automatically employed to mechanically actuate pressure switches so that the motor and pump will be reversed and revolved in opposite directions on any successive actuations of the valve from the remote control station.

A further object of the invention is the provision of a gate valve mechanism of the character described which may be conveniently assembled and economically installed, and maintained at a considerably reduced expense when compared to known methods of operating gate valves of the character described.

With such object in view, as well as other advantages which may be incident to the use of the improvements, the invention consists in the parts and combinations thereof hereinafter set forth and claimed, with the understanding that the several necessary elements constituting the same may be varied in proportion and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Fig. 2 is an enlarged vertical sectional view on line 2—2 of Fig. 1.

Fig. 5 is a diagrammatic view in plan of the switches, control station and intermediate wiring, to effect a reversal of the motor and pump with consequent reversal of the direction of flow of the fluid medium, to control the successive movement of the valve in opposite directions when opening and closing the same.

Figure 1:
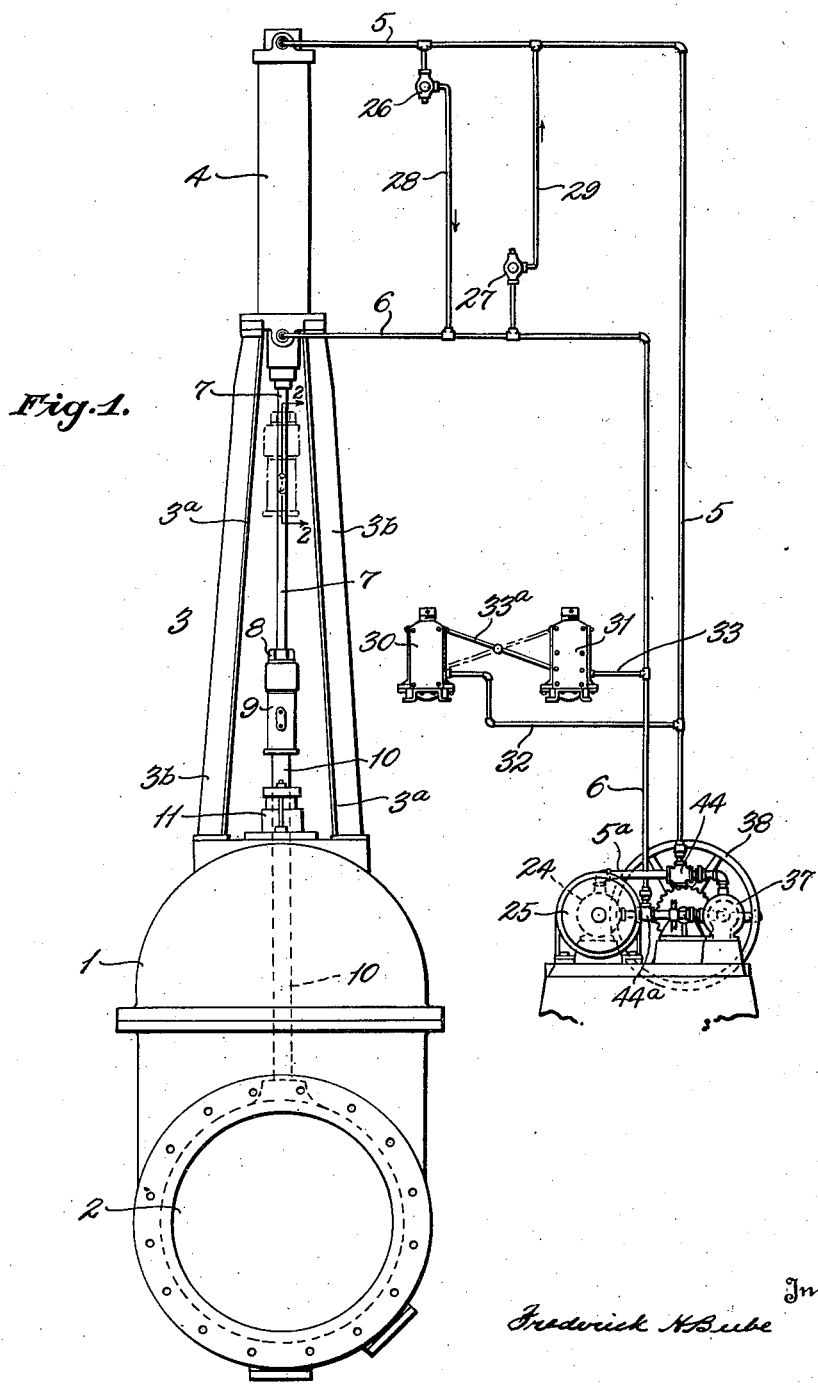
Fig. 1 is a side view, largely diagrammatic in character, and illustrating my preferred embodiment of the invention.

Referring to the drawings and with particular reference to Fig. 1, the valve housing is represented at 1 and contains a gate valve 2 of any desired type, for example said valve may be the usual hot valve of a water gas generating apparatus. A suitable frame structure 3 is mounted above the valve housing, which frame may consist as illustrated of two or more vertically disposed beams or standards 3ª having reinforcing webs or flanges 3ᵇ. The frame structure 3 is designed to support at its upper end a hydraulic pressure cylinder 4, preferably an oil pressure cylinder and having oil supply pipe lines 5 and 6 connecting respectively with the upper and lower ends of said cylinder. The piston rod 7 of the oil pressure cylinder is designed for vertical reciprocation and projects downwardly through the usual stuffing boxes of the cylinder, passes loosely through a centrally apertured threaded nut or head 8 of a coupling member 9 and is secured at its lower end to an internal collar member 8ª mounted for limited vertical reciprocation within the tubular sleeve or casing 9ª of the standard compression coupling generally designed at 9. The gate valve 2 is provided with a valve stem 10, the upper end of which projects upwardly for vertical reciprocation within a suitable bearing 11 secured to the valve housing, said valve stem being threaded or otherwise secured at its upper end to a second internal collar member or plunger 12 of the compression coupling 9. The tubular sleeve or casing 9ª is threaded or otherwise secured at its lower end to the lower collar member 12 and has a threaded connection at its upper end with an outer casing member 13, the latter having a screw threaded engagement 13ª with the centrally apertured nut or head through which the lower end of the piston rod 7 of the oil pressure cylinder loosely extends. A compression spring 14 is housed within the compression coupling casing and normally rests freely upon the lower collar member 12 of the coupling. The upper end of the compression spring 14 is designed to contact against and yieldingly resist the downward movement of the upper internal collar member 8ª during the operation of closing the gate valve 2.

In the embodiment of the invention illustrated the valve is designed to remain closed or in its downward position by gravity. In order to maintain the valve in its uppermost position after the motor and hydraulic pressure has been automatically shut off at the conclusion of the up-stroke, a suitable automatic latch mechanism is provided. Referring to Fig. 2, a latch member or plate 15 is pivotally mounted at 16 to ears or brackets 17 secured to the frame 3. The plate or latch member 15 is provided with a roller 18 normally disposed by gravity in the path of a projecting lug or trip cam 19 which may be integrally formed as a part of the bottom plate 20 of the compression coupling 9 secured to the gate valve stem 10. A suitable counter-weight 21 carried by the pivoted latch 15 serves to normally maintain the roller 18 of the latch member in the path of the lug 19 as illustrated in Fig. 2. When the valve is being moved upwardly by hydraulic pressure to open position, and immediately prior to the completion of its upward movement, the beveled face of the lug 19 contacts with and moves outwardly the roller 18 of the pivoted plate 15, thereby permitting the lug 19 to pass. Thereafter the weighted latch plate 15 swings again into place and the engagement of the underside of the lug 19 with the top of the roller 18 prevents the valve stem from moving again downwardly after the valve actuating mechanism has been shut off.

When the valve is moved downwardly to closed position due to hydraulic pressure exerted from the upper end of the cylinder 4, the piston rod 7 of the cylinder carries downwardly a cam plate 21 suitably secured to a bracket member 22 in turn adjustably secured to the piston rod 7 of said pressure cylinder. The initial downward movement of the piston rod 7 does not immediately move the stem 10 of the gate valve due to the limited independent movement permitted by the compression coupling 9 disposed therebetween. This initial downward movement however, engages the beveled face of a lug 23, preferably integrally formed with the cam plate 21, with the roller 18 of the pivoted latch plate 15, thereby moving the latter outwardly to permit the subsequent clearance of the lug 19 secured to the valve stem 10. At the time the beveled lug 23 on the cam plate 21 is engaging and swinging the latch plate 15 outwardly on its pivot, the piston rod 7 with its collar or plunger 8a is moving downwardly within the casing 9a of the coupling member against the compression of the spring 14. This relative movement continues until the collar 8a contacts with the upper end 10a of the valve stem 10 at which time the latter with the valve 2 is thereafter moved downwardly towards its closed position, the clearance between lug 19 and roller 18 having been effected and permitted by the action of the lug 23 as above described.

It will be understood that when the valve is moved upwardly to open position, due to hydraulic pressure exerted from the lower end of cylinder 4, there is no movement of the valve stem 10 and valve 2 until the piston rod 7 has ascended within the compression coupling 9 a distance sufficient to move the internal collar 8a from contact with the stem 10 and engage the upper face of said collar with the lower face of the nut or head 8 secured to the casing of the coupling member. It will be further apparent that the threaded engagement 13a of the nut 8 with the sleeve 13 together with the threaded engagement 13b of the latter with the casing 9a, permits any desired adjustment to regulate the extent and degree of the cushioning effect of the compression coupling to insure the effective operation of the valve and reduce to a minimum the possibility of damage due to excessive strains.

Referring again to Fig. 1, the hydraulic pressure, preferably oil, for actuating the piston within the pressure cylinder 4 to close the valve 2, is supplied to the top of said cylinder through the pipe line 5 from a rotary and reversible pump 24 which is suitably geared to and driven by a reversible motor 25. The fluid is supplied to the bottom of the cylinder 4 to raise or open the valve 2, through the pipe line 6 also communicating with the pump. The fluid is pumped under pressure through the pipe line 6 to open the valve after the latter has been closed when the direction of the motor 25 and pump 24 is reversed in a manner to be hereinafter described.

In order to guard against possible damage to the apparatus and excessive pressure in the pipe lines in the event that the pump and motor continue to operate after the valve and piston rods have reached the limit of their movement to either open or closed position, suitable relief valves 26 and 27 are interposed and connected respectively by bypass pipe lines 28 and 29 with the pipe lines 5 and 6. The valves 26 and 27 are of the usual check valve type to permit the oil to flow therethrough in one direction only, and are set with springs to cause the valves 26 and 27 to open at a definite pressure preferably in excess of the pressure required to operate the gate valve 2. The relief valve 26 may be set to permit the oil to flow only in the direction indicated by the arrow in the pipe line 28, and the relief or check valve 27 is set to permit the oil to flow only in the opposite direction as indicated by the arrow in the pipe line 29. It will therefore be apparent that the valves 26 and 27 provide a safety shunt for the oil circulation to enable the oil to circulate freely through the pipes 5 and 6 and pump 24 in either direction independently of and without further movement of the piston in the pressure cylinder 4 after the piston rod 7 has reached the limit of its stroke in either direction.

Figure 3:
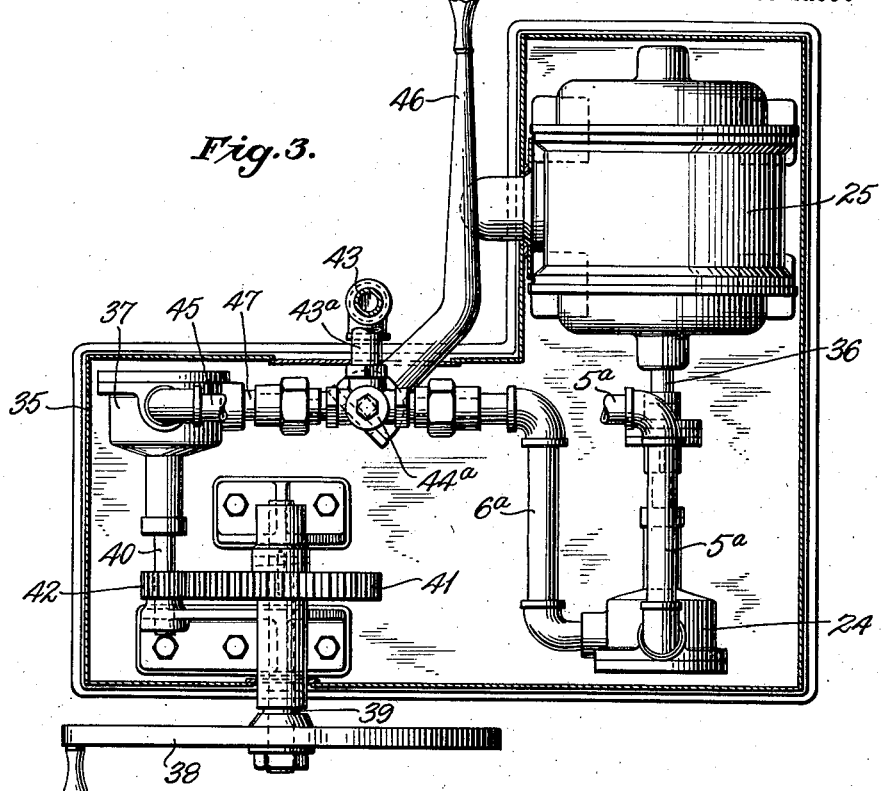
Fig. 3 is a plan view of the reversible motor and pump mechanism for electrically or manually effecting the vertical reciprocation of the gate valve at the desired intervals, the housing for said motor and pumps being cut away to more clearly illustrate these elements.
Figure 4:
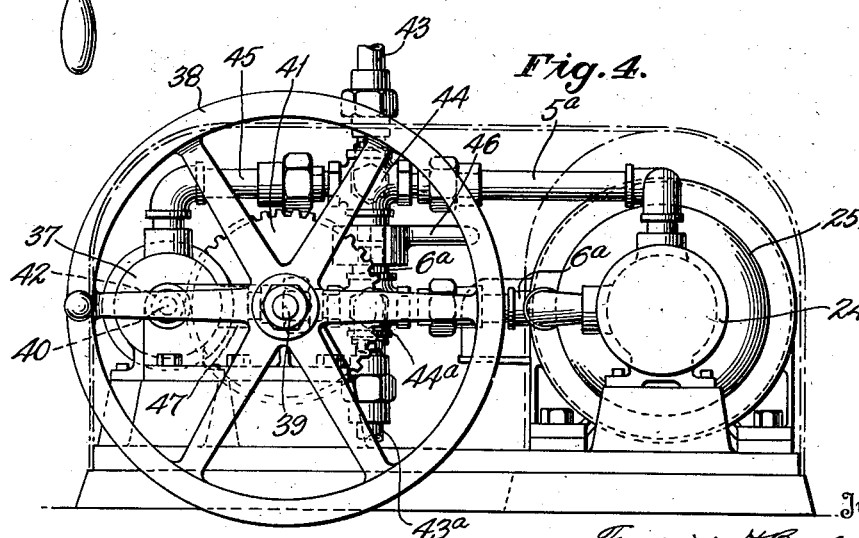
Fig. 4 is a side view of the motor and pump illustrated in Fig. 3.

As best seen in Figs. 3 and 4 the reversible motor 25 and reversible pump 24 are disposed within a protective housing or casing 35 and the pump 24 may be directly connected or otherwise geared to the armature shaft 36 of the motor. The oil supply enters the pump 24 from one end of the pressure cylinder 4 by means of the pipes 43 and 5a and from the other end of said pressure cylinder through the pipes 43a and 6a.

Referring again to Fig. 1, a pair of pressure switches 30 and 31 are provided and are preferably located adjacent to the motor and pump installation. The pressure switch 30 is communicably connected to the oil pressure pipe line 5 by a branch pipe or connection 32, and the pressure switch 31 communicates with the oil pipe line 6 by means of a branch pipe 33. The pressure switches 30, 31 are suitably interlocked in any well known or preferred manner as at 33a so that when the circuit is closed on one switch it is forced open on the other so that it is impossible to have both circuits closed at the same time. In the embodiment illustrated pressure switch 31 is designed to be actuated to open by oil pressure through the branch pipe 32 when the valve has reached its limit of downward movement to closed position due to pressure built up in the pipe line 5 from the pump 24, said pressure operating to close switch 30 and simultaneously open switch 31 through interlocking mechanism 33a. Conversely when the valve has completed its upward movement to open position due to the actuation of the now closed switch 30 from a remote control station, (switch 31 being open, the oil pressure built up in pipe line 6 resulting from the piston reaching its upward limit of travel, is transmitted through branch pipe 33 to close switch 31 and simultaneously through interlocking mechanism 33a to open interlocked switch 30. It will be understood that pressure switches 30 and 31 are suitably electrically connected with a remote control station indicated at 34 in Fig. 5 and a magnetic relay reversing switch of well known type is interposed in the circuit at or near the remote control station and between the motor 25 and the source of current supply. This arrangement permits the valve 2 to be opened and closed by the alternate reversal of the motor 25 and pump 24, effected by successive depressions of control buttons and without requiring the button to be maintained depressed until the valve has completed its stroke. It will be further understood from the mechanism described, when the valve is actuated by pressing a button at the remote control station, an electrical circuit is completed with the motor 25 through either pressure switch 30 or pressure switch 31, depending upon the position of the valve, and the energizing of the motor 25 operates the pump 24 to move the valve by hydraulic pressure to its next succeeding position. The oil pressure built up at the completion of the valve stroke reverses the respective positions of the pressure switches as described, and results in a reversal of the motor and pump to move the valve in the opposite direction when the push button in the remote control station is again depressed.

In the event that the motor is not operating and the current is shut off, means are provided for operating the oil pressure lines to open and close the valve by means of an auxiliary independently and manually operated hand pump. As best illustrated in Figs. 3 and 4, the manually operated means for controlling the valve consists in an auxiliary pump 37 which may be mounted within the housing 35. The pump 37 may be operated at high speed by means of the hand wheel 38 fast on a shaft 39 having suitable bearings within the housing and geared to pump shaft 40 by means of the intermeshing high speed gears 41 and 42. The oil supply from one end of the pressure cylinder 4 passes through pipe 43 and thence through the valve 44 to either pipe 5ª, communicating with the motor driven pump 24, or pipe 45 communicating with the hand operated pump 37, depending upon the position of the valve 44. The oil supply passes back to the other end of the pressure cylinder 4 through valve 44ª and pipe 43ª from either pipe 6ª leading from the motor driven pump 24, or pipe 47 leading from the hand operated pump 37, depending upon the position of the valve 44ª. Both valves 44 and 44ª are suitably interlocked and controlled by a hand lever 46 in such manner that both valves are simultaneously closed or opened by swinging said hand lever. In this manner the pressure fluid from the cylinder 4 is caused to circulate to and from said cylinder either through motor driven pump 24 or through hand operated pump 37, depending upon the position of the hand lever 46.

The oil supply pipes 43 and 43ª, (Fig. 4), leading to the opposite ends of the pressure cylinder 4 are common to both pump systems. In the event that the motor 25 is thrown out of operation and the hand operated pump is employed to actuate the gate valve 2, valves 44 and 44ª are actuated by the hand lever 46 to shut off the oil supply from the pressure cylinder 4 to the pipe lines 6ª and 6ª and said oil is admitted to the pipe 45. The oil pressure built up by the hand operated pump 37 is transmitted to the other end of the pressure cylinder 4 through the pipes 47 and 43ª (Fig. 3) in a similar manner as is illustrated in Fig. 1 in connection with the motor operated system. It will be further apparent that by reversing the direction of rotation of the hand wheel 38 and pump 37, the direction of movement of the valve 2, controlled by said pump through the pressure lines 43 and 43ª leading to the cylinder 4, will be consequently reversed.

Referring to the diagrammatic illustration in Fig. 5, the motor 25 for operating the oil pump 24 is illustrated as of the three phase type and obtains its power from a three phase source of supply 50. Interposed between the motor and the source of supply is any suitable form of reversing switch. For convenience it is preferred to use a magnetic reversing switch which may be operated from the remote control push button station 34.

The reversing switch may take the form of a four pole double throw switch, the blades of which are maintained in a neutral or open circuit position by means of springs or the like. In the embodiment illustrated, two sets of four movable blades 51, 51ª have been illustrated but it is to be understood that a single set of blades operating between spaced, stationary contacts may be used to equal advantage. Magnetic closing and holding coils or solenoids 52 and 53 are provided which may be selectively energized from one phase of the main line 50 to move the blades of the switch in either of their two positions for driving the motor in the desired direction. As shown in the diagram, the closing of the switch blades to the right hand side serves to drive the motor in a direction to cause the pump to force oil through the pipe line 6 (Fig. 1), connected to the lower side of the hydraulic cylinder 4 and thus raise the piston and open the valve 2. Conversely, by closing the switch on the left hand side, a reverse operation of the motor and of the valve is effected due to oil pressure built up at the top of the cylinder 4 through pressure line 5.

As heretofore described the pressure switches 30 and 31 are indicated by their respective branch pipes to the pressure lines 5 and 6, each switch being set so as to automatically open the electric circuit which it controls upon the building up of excess fluid pressure in its oil line. The pressure built up to actuate the switches 30 and 31 results from the piston rod 7 and valve stem 10 reaching the end of their stroke and while the pump 24 continues to operate. As before stated these pressure switches are so interlocked that when the one is opened the other is closed and each serves to stop the motor driving the hydraulic pump when the valve reaches one of its extreme positions. In the embodiment illustrated pressure switch 30 opens and stops the motor when the valve has reached its lowermost movement to closed position, and switch 31 opens to stop the motor when the valve reaches its uppermost limit or movement to open position.

The pressure switches 30 and 31 are interposed in the controlling circuits for the reversing switch which operates solenoids 52 and 53. Pressure switch 30 is disposed in the circuit of solenoid 53 and pressure switch 31 is disposed in the circuit of solenoid 52. The reversing switch is preferably located conveniently near the pump 24 and motor 25 while the push button control station 34 may be located at any point desired for controlling the operation of the valve.

The push button control station comprises preferably three push buttons 54, 55 and 56 each operating between four stationary contacts, two of which latter are bridged by the button in its upper position where it is retained by a suitable spring (not shown) and the other two of which are bridged by the button in its lower position where it must be held manually.

To operate the motor to raise and open the valve, assuming it to have been previously closed, push button 54 is depressed to close the circuit between its stationary contacts 57 and 58 at which time current passes from the center wire of the main circuit 50 through the conductor 59, through the temperature overload relay 60 which may be of any desired standard type, thence to one end of the switch operating solenoid 53 and thence to pressure switch 30, which is closed, from which it passes to upper contact 61 of push button 55 through the push button to contact No. 62 thereof, through the wire 63 to lower contact 57 of push button 54, through this push button to contact No. 58, thence to upper contact 64 of push botton 56, through this push button to contact 65 and through conductor 66 to one of the outside wires of the main line completing a single phase circuit and thereby energizing solenoid 53 and moving the right hand switch to a closed position to start the motor 25. To render it unnecessary to hold the button 54 down throughout the complete movement of the valve to open position, contacts 67, 68 are provided on the reversing switch which close with the switch and form a shunt around the contacts 57 and 58 of push button 54, which therefore need only be closed momentarily to energize the solenoid 53. At the end of the raising operation the excess pressure built up by the pump in the hydraulic cylinder and in the oil line 6, causes pressure switch 31 to close, and this switch being interlocked with pressure switch 30 causes the latter to open, thus breaking the circuit to solenoid 53 and allowing the reversing switch to be drawn to its open circuit position by the springs (not shown) previously mentioned.

The opening of pressure switch 30 and the closing of pressure switch 31 stops the motor and leaves the parts in condition for lowering the valve when this may be desired. To lower and close the valve, push button 55 is depressed, closing the circuit through pressure switch 31 and energizing the reversing switch operating solenoid thus closing the left hand switch shown in Fig. 5. The circuits 52, controlling the energizing of the solenoid 52 are substantially identical with those controlling the closing of the solenoid 53, as has already been described, and it is not believed necessary to go into detail on this point.

It should be noted that push button 55 must be in its upper position to allow push button 54 to complete its proper circuit and vice versa so that the inadvertent pushing of both buttons will not result in damage to the valve mechanism or to the circuits and switches controlling the same.

In the event that it may become desirable to stop the valve in an intermediate position, this may be done during the operation of the motor and valve in either direction by depressing push button 56 which is in circuit with the shunt contacts 67, 68 on one side of the switch and the corresponding ones 69 and 70 on the other side thereof, so that the holding circuit for whichever solenoid 52 or 53 is energized, will be opened, deenergizing this solenoid and allowing the reversing switch to assume its neutral position, thus stopping the motor and the valve piston at any desired point in its stroke. To again move the valve it is necessary to again depress the same push button previously actuated to move the valve in the direction it was traveling when stopped. In other words the original direction of motion of the valve must be continued until completed, and in the diagram illustrated it is not possible to reverse the movement of the valve from any intermediate position.

What I claim is:
1. An apparatus for controlling gate valves comprising in combination: a valve, a fluid pressure cylinder operatively connected thereto, a pump, fluid pressure lines connect- ing said pump with said pressure cylinder to form a circuit, one of said lines operating for supply of pressure fluid and another of said lines operating for return of fluid from said cylinder to said pump, a motor operatively connected to said pump, and means for energizing said motor to operate said pump to circulate said fluid in said pressure lines to and from said pressure cylinder.

2. An apparatus for controlling gate valves comprising in combination: a valve, a fluid pressure cylinder operatively connected thereto, a pump, fluid pressure lines connecting said pump with said pressure cylinder, a motor operatively connected to said pump, and means for reversing said motor and said pump to reverse the flow of fluid in said pressure lines to and from said pressure cylinder.

3. An apparatus for controlling gate valves comprising in combination: a valve, a fluid pressure cylinder operatively connected thereto, a pump, fluid pressure lines connecting said pump with said pressure cylinder, a motor operatively connected to said pump, means for energizing said motor and said pump to circulate said fluid in said pressure lines to and from said pressure cylinder, and auxiliary pressure lines located within said fluid pressure lines to permit said fluid to be circulated through said pump independently of said pressure cylinder.

4. An apparatus for controlling gate valves comprising in combination: a valve, a fluid pressure cylinder operatively connected thereto, a reversible pump, main fluid pressure lines connecting said pump with said pressure cylinder, a reversible motor operatively connected to said pump, means for reversing said motor and said pump to reverse the flow of fluid in said pressure lines, and auxiliary pressure lines interposed within said main fluid pressure lines to permit the fluid to be circulated through said pump independently of said pressure cylinder.

5. An apparatus for operating gate valves comprising a pressure cylinder having a piston operatively connected to said valve, fluid pressure lines communicating with said cylinder, a reversible pump connected to said fluid pressure lines, a control station, and a reversible motor operatively connected to said pump and electrically connected to said control station, whereby said motor may be reversed from said control station to reverse and drive said pump and actuate said piston to reciprocate said valve in opposite directions.

6. An apparatus for operating gate valves comprising a pressure cylinder having a piston operatively connected to said valve, fluid pressure lines communicating with said cylinder, a pump connected to said fluid pressure lines, a control station, and a motor operatively connected to said pump and electrically connected to said control station, whereby said motor may be energized from said control station to drive said pump and actuate said piston to reciprocate said valve.

7. An apparatus for controlling gate valves, comprising in combination: a valve, a fluid pressure cylinder operatively connected therewith, cushioning means interposed between said valve and said cylinder, a pump, fluid pressure lines connecting said pump with said fluid pressure cylinder, a motor operatively connected to said pump, and means energized from a remote control station to reverse said pump and said motor to reverse the direction of flow in said pressure lines to reverse the travel of said valve.

8. An apparatus for operating gate valves comprising a hydraulic pressure cylinder having a piston operatively connected to said valve, fluid pressure lines communicating with said cylinder, a pump for actuating said pressure cylinder through said pressure lines, and a motor operatively connected to said pump, whereby said gate valve is actuated by said pressure cylinder when said motor is energized.

9. An apparatus for controlling gate valves, comprising in combination: a valve having a valve stem, a fluid pressure cylinder having a piston rod operatively connected to said valve stem, a pump, a motor operatively connected to said pump, means for energizing said motor, fluid pressure lines connecting said pump with said pressure cylinder, and a plurality of pressure switches communicably connected to said pressure lines and electrically connected with said motor, whereby the fluid pressure in said pressure lines actuates said pressure switches to reverse the respective positions of the same at the conclusion of the movement of the piston rod and said valve, to permit said motor to be reversed when the latter is again energized to reverse the direction of travel of the fluid in said pressure lines and move said valve in the opposite direction.

10. An apparatus for controlling gate valves, comprising in combination: a valve having a valve stem, a fluid pressure cylinder having a piston rod, cushioning means interposed between said valve stem and said piston rod and operatively connected thereto, a pump, a reversible motor operatively connected to said pump, means for energizing said motor, fluid pressure lines connecting said pump with the upper and lower portions of said pressure cylinder, and a plurality of interlocked pressure switches communicably connected to said pressure lines and electrically connected with said motor, whereby the fluid pressure in said pressure lines actuates said pressure switches to reverse the respective positions of the same at the conclusion of the movement of the piston rod and said valve, to permit said motor to be reversed when the latter is again energized by said energizing means to reverse the direction of travel of the fluid in said pressure lines and move said valve in a direction opposite to its prior direction of travel.

11. An apparatus for actuating gate valves comprising a pressure cylinder having a piston operatively connected to said valve, a pump for actuating said piston in opposite directions, fluid pressure lines disposed between said pump and said cylinder, a plurality of interlocked switches communicably connected to said fluid lines, a motor for actuating said pump and electrically connected with said pressure switches, and a control circuit for energizing said motor and electrically connected with said pressure switches, said pressure switches being alternately thrown into circuit by fluid pressure built up by said pump, whereby said motor and said pump are alternately reversed when said motor is energized through said electrical circuit and said pressure switches to actuate said piston and move said valve successively in opposite directions.

12. In motor-operated gate-valve apparatus, in combination: a gate-valve; a hydraulic cylinder directly connected to and operating said gate valve; hydraulic pressure lines connected in circuit to said cylinder; and motor driven means individual to and connected in the same circuit with said pressure lines and operating and controlling the same.

13. In motor-operated gate-valve apparatus, in combination: a gate valve; a hydraulic cylinder directly connected to and operating said gate valve; two hydraulic pressure lines connected to said cylinder and alternately serving as high pressure supply and low pressure return; and a reversible motor-driven pump individually in circuit with and operating said pressure lines.

In testimony whereof I have hereunto set my hand.

FREDERICK H. BEEBE.